(12) United States Patent
Jia et al.

(10) Patent No.: US 7,149,004 B2
(45) Date of Patent: Dec. 12, 2006

(54) SYSTEM AND METHOD OF PROCESSING SCANNED NEGATIVE IMAGE

(75) Inventors: Charles Chi Jia, San Diego, CA (US); Laura Xiaoluo Zhou, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 891 days.

(21) Appl. No.: 10/175,601

(22) Filed: Jun. 18, 2002

(65) Prior Publication Data

US 2003/0231292 A1 Dec. 18, 2003

(51) Int. Cl.
H04N 1/04 (2006.01)

(52) U.S. Cl. .................. 358/474; 358/501; 358/527; 430/359; 430/505

(58) Field of Classification Search ............. 358/474, 358/501, 505, 515, 520, 527, 401, 487, 448, 358/302; 430/359, 505
See application file for complete search history.

(56) References Cited

U.S. PATENT DOCUMENTS

| | | | |
|---|---|---|---|
| 4,821,073 A | 4/1989 | Backus et al. | |
| 5,313,251 A * | 5/1994 | Fierstein et al. ............. | 355/77 |
| 5,319,401 A | 6/1994 | Hicks | |
| 5,353,095 A | 10/1994 | Terashita | |
| 5,477,353 A | 12/1995 | Yamasaki | |
| 5,555,073 A | 9/1996 | Grossman et al. | |
| 5,629,753 A | 5/1997 | Akira | |
| 5,701,170 A | 12/1997 | Powers et al. | |
| 5,719,661 A | 2/1998 | Terashita | |
| 5,847,809 A | 12/1998 | Masutani | |
| 5,910,835 A | 6/1999 | Masutani | |
| 5,995,194 A * | 11/1999 | Terashita ................. | 355/35 |
| 5,995,197 A | 11/1999 | Yoshino | |
| 6,008,878 A | 12/1999 | Masutani | |
| 6,052,174 A | 4/2000 | Terajima et al. | |
| 6,204,940 B1 | 3/2001 | Lin et al. | |
| 6,221,569 B1 * | 4/2001 | Ishikawa ................. | 430/359 |
| 6,381,042 B1 | 4/2002 | Batchelder et al. | |
| 6,762,863 B1 * | 7/2004 | Minakuti et al. ........... | 358/487 |
| 6,900,825 B1 * | 5/2005 | Kito .......................... | 347/239 |

OTHER PUBLICATIONS

Phillip Chong, "Versatile Working Tool", The New Press Times, 1996, pp. 1-3. Retrieved from Dow Jones Publications Library.
"Kodak To Ship Film With DX Code Frame Number Modification", Dow Jones News Service, 1991, p. 1: Retrieved from Dow Jones Publications Library.
Steven Simon, "Now Cameras Will Even Set Film Speed For You", The Toronto Star, 1986, pp. 1-2. Retrieved from Dow Jones Publications Library.
"A Complete Digital Imaging Solution with the speed to scan every roll: F-12+ Scanner", Pakon, Inc. 2001 pp. 1-3.

* cited by examiner

Primary Examiner—Douglas Q. Tran
Assistant Examiner—Negussie Worku

(57) ABSTRACT

A method of processing a scanned negative image produced by scanning a negative film includes creating a baseline positive image from the scanned negative image, analyzing at least one image characteristic of the baseline positive image, determining a film type of the negative film based on the at least one image characteristic, and producing a positive image from the scanned negative image based on the film type, including applying film-specific color inversion to the scanned negative image.

29 Claims, 6 Drawing Sheets

SYSTEM AND METHOD OF PROCESSING SCANNED NEGATIVE IMAGE

BACKGROUND OF THE INVENTION

Conventional cameras use negative film to capture images. The film is typically developed using a chemical process to form negative images on the film. Often, the negative images are then used to generate positive images on photographic paper through another chemical process.

A conventional scanning system used for scanning and reproducing an image typically includes a light source and a sensor array, such as a charge coupled device (CCD) or contact imaging sensor (CIS), which includes light receptors which can detect variations in light intensity and frequency. As such, the light source illuminates the image and the sensor array converts reflected or transmitted light from the image into electrical signals. Thus, the electrical signals can then be stored in a file, manipulated by programs, and/or used for reproduction of the image by, for example, a display and/or a printer.

By scanning negative film, a scanned negative image can be produced. Thus, to produce a positive image from the scanned negative image, the conventional scanning system must convert the scanned negative image into positive form. Existing scanning systems often convert such negative images into positive form by using statistical methods. Such methods, however, may not produce an accurate representation of the original image.

For these and other reasons, there is a need for the present invention.

SUMMARY OF THE INVENTION

One aspect of the present invention provides a method of processing a scanned negative image produced by scanning a negative film. The method includes creating a baseline positive image from the scanned negative image, analyzing at least one image characteristic of the baseline positive image, determining a film type of the negative film based on the at least one image characteristic, and producing a positive image from the scanned negative image based on the film type, including applying film-specific color inversion to the scanned negative image.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
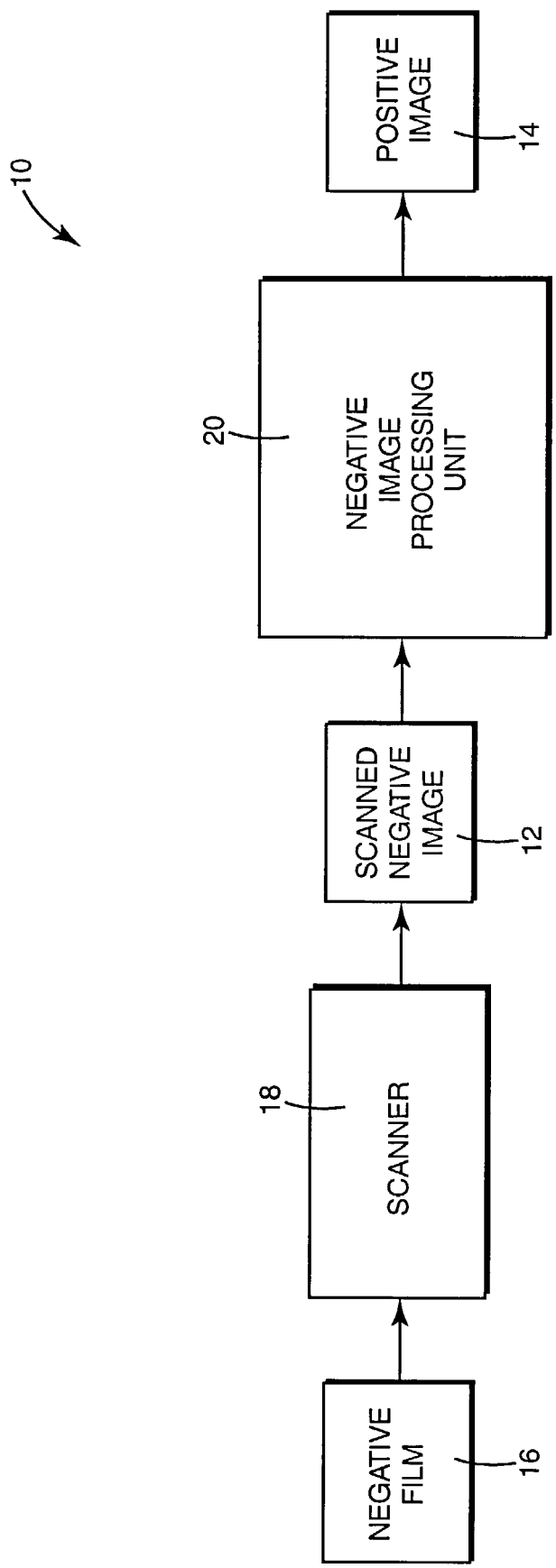
FIG. 1 is a schematic illustration of one embodiment of an image processing system.

FIG. 1 illustrates one embodiment of an image processing system 10. Image processing system 10 facilitates processing of a scanned negative image 12 to create a positive image 14. In one embodiment, scanned negative image 12 is produced by scanning negative film 16 with, for example, a scanner 18. Negative film 16 includes inverse or negative images produced, for example, by photographic techniques as is well known in the art. Negative film 16 may include one or more frames of individual or multiple images.

The process to convert images of negative film 16 to positive images 14 can occur in scanner 18 and/or an associated computing system. In addition, the process can be distributed throughout the system with individual portions of the process being implemented in separate system components. Furthermore, the process can be implemented in hardware, software, firmware, or a combination of these.

Scanner 18 includes, for example, a light source (not shown) which illuminates negative film 16 and a sensor array (not shown), such as a charge coupled device (CCD) or contact imaging sensor (CIS), which converts reflected or transmitted light into electrical signals, as is well known in the art. Each element of the sensor array produces a data signal that is representative of the intensity and/or color of light from a small area of the negative film 16 commonly referred to as a picture element or pixel. As such, scanner 18 reproduces negative images from negative film 16.

To create positive image 14 from scanned negative image 12, image processing system 10 includes a negative image processing unit 20. In one embodiment, as described below, negative image processing unit 20 creates a baseline positive image from scanned negative image 12, analyzes a content of the baseline positive image to assess image characteristics of the baseline positive image, and assesses a film type of negative film 16 based on the image characteristics of the baseline positive image. As such, negative image processing unit 20 produces positive image 14 from scanned negative image 12 based on the assessed film type of negative film 16, as described below.

Figure 2:
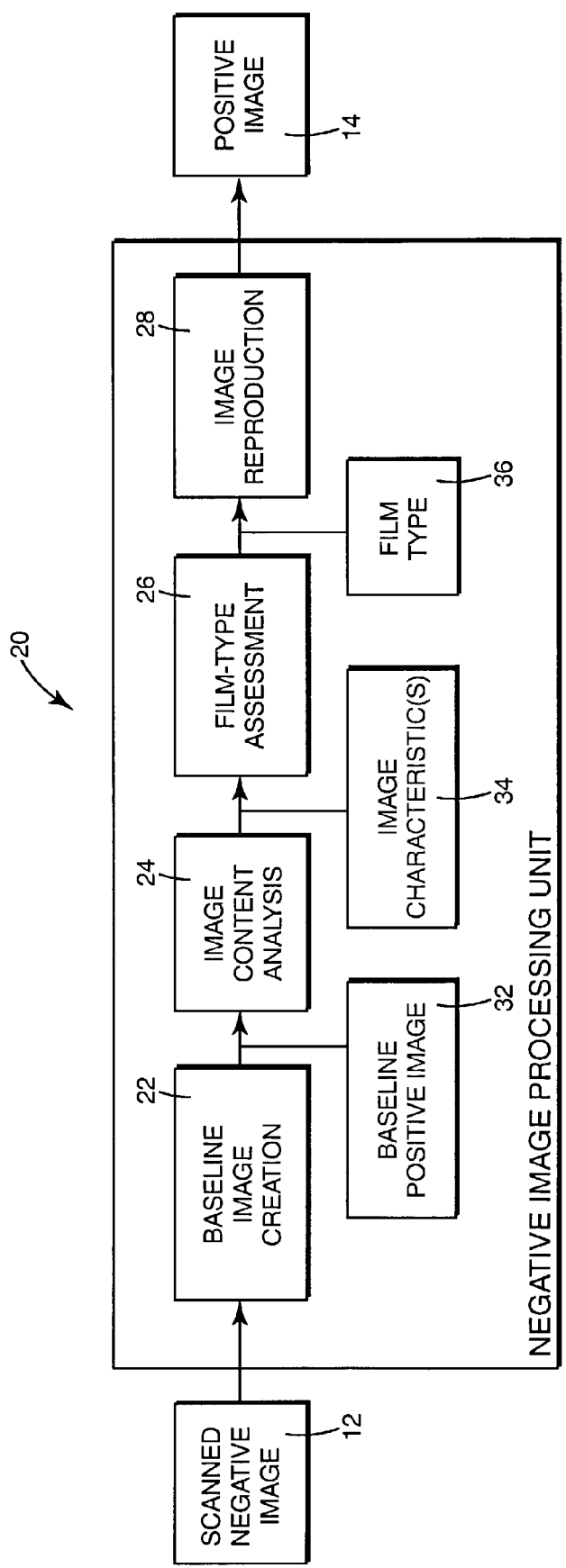
FIG. 2 is a schematic illustration of one embodiment of a negative image processing unit of the image processing system of FIG. 1.

In one embodiment, as illustrated in FIG. 2, negative image processing unit 20 includes a baseline image creation module or unit 22, an image content analysis module or unit 24, a film type assessment module or unit 26, and an image reproduction module or unit 28. As described below, baseline image creation unit 22 creates a baseline positive image 32 from scanned negative image 12, image content analysis unit 24 assesses image characteristics 34 of baseline positive image 32, film type assessment unit 26 assesses a film type 36 of negative film 16 based on image characteristics 34, and image reproduction unit 28 produces positive image 14 from scanned negative image 12 based on film type 36.

Negative image processing unit 20 includes hardware, software, firmware, or a combination of these. In one embodiment, negative image processing unit 20 is included in a computer, computer server, or other microprocessor-based system capable of performing a sequence of logic operations. Components of negative image processing unit 20, including baseline image creation unit 22, image content analysis unit 24, film type assessment unit 26, and/or image reproduction unit 28, can be implemented in hardware via a microprocessor, programmable logic device, or state machine, in firmware, or in software within a given device. Baseline image creation unit 22, image content analysis unit 24, film type assessment unit 26, and/or image reproduction unit 28 may be implemented, for example, as subroutines of a computer program.

Baseline image creation unit 22 creates baseline positive image 32 from scanned negative image 12. In one embodiment, baseline image creation unit 22 applies film-generic color inversion to scanned negative image 12. Thus, scanned negative image 12 is converted to positive form regardless of the specific type of film of negative film 16.

Figures 3, 4:
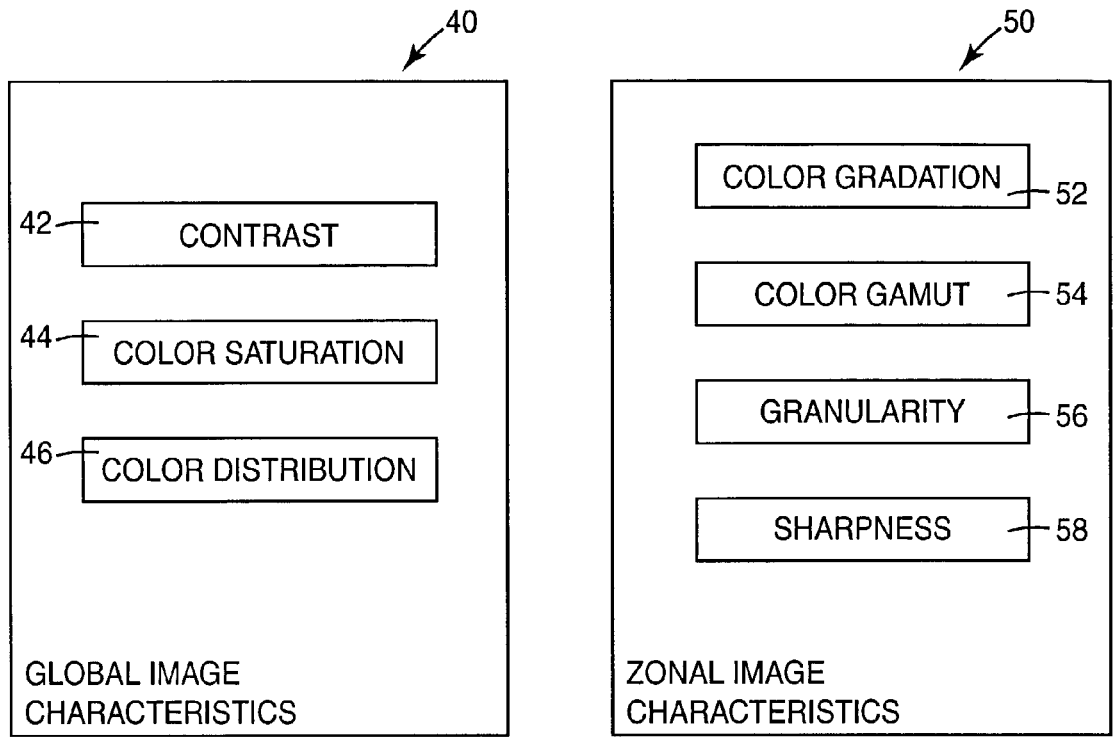
FIG. 3 is a diagram illustrating one embodiment of global image characteristics analyzed by the negative image processing unit of FIG. 2.
FIG. 4 is a diagram illustrating one embodiment of zonal image characteristics analyzed by the negative image processing unit of FIG. 2.

In one embodiment, as illustrated in FIGS. 3 and 4, negative image processing unit 20, including, more specifically, image content analysis unit 24, assesses global image characteristics 40 and/or zonal image characteristics 50 of baseline positive image 32. As such, image characteristics 34 of baseline positive image 32 include global image characteristics 40 and/or zonal image characteristics 50.

As illustrated in the embodiment of FIG. 3, global image characteristics 40 include a contrast 42 of baseline positive image 32, a color saturation 44 of baseline positive image 32, and/or a color distribution 46 of baseline positive image 32. Contrast 42 of baseline positive image 32 includes, for example, a dynamic range of baseline positive image 32 such as a range between a darkest spot or area of baseline positive image 32 and a lightest spot or area of baseline positive image 32. Color saturation 44 of baseline positive image 32 includes, for example, a most prevalent color of baseline positive image 32. Color distribution 46 of baseline positive image 32 includes, for example, a density or variation of colors in baseline positive image 32 such as dark colors versus light colors and/or a comparison of specific colors in baseline positive image 32.

As illustrated in the embodiment of FIG. 4, zonal image characteristics 50 include a color gradation 52 of baseline positive image 32, a color gamut 54 of baseline positive image 32, a granularity 56 of baseline positive image 32, and/or a sharpness of baseline positive image 32. Color gradation 52 of baseline positive image 32 includes, for example, a degree of advance from one tint or shade of a color to another tint or shade of the color in baseline positive image 32. Color gamut 54 of baseline positive image 32 includes, for example, a palette or entire series or range of colors in baseline positive image 32. Granularity 56 of baseline positive image 32 includes, for example, a grain-like appearance or prevalence in baseline positive image 32. Sharpness 58 of baseline positive image 32 includes, for example, a clarity and/or distinctiveness in baseline positive image 32.

Figure 5:
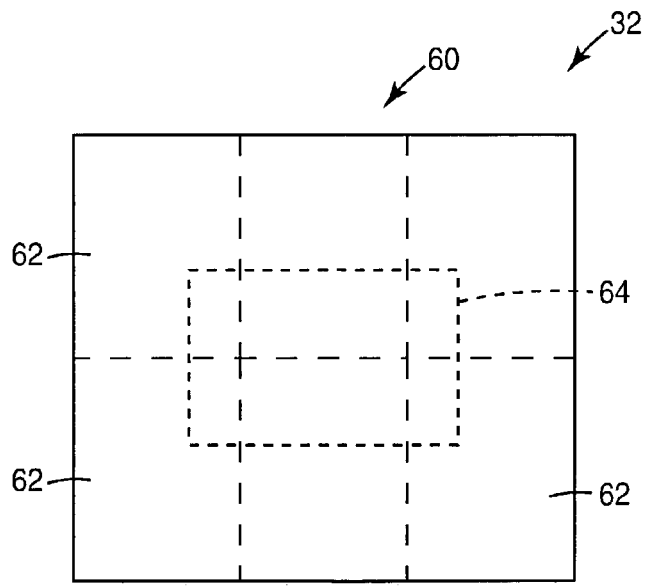
FIG. 5 is a schematic illustration of one embodiment of a baseline positive image divided into a plurality of zones by the negative image processing unit of FIG. 2.

In one embodiment, as illustrated in FIG. 5, to assess zonal image characteristics 50 of baseline positive image 32, image content analysis unit 24 divides baseline positive image 32 into a plurality of zones 60. As such, image content analysis unit 24 assesses zonal image characteristics 50 for each of the zones 60. In one embodiment, zones 60 include an array of zones 62. The array of zones 62 includes, for example, columns and rows of individual zones of baseline positive image 32. While the array of zones 62 is illustrated as including three columns and two rows of individual zones, it is understood that the array of zones 62 may include any number of columns and/or rows. In one embodiment, zones 60 include a central zone 64. Preferably, central zone 64 is substantially centered in baseline positive image 32. Central zone 64, therefore, typically includes the intended subject matter of the image. Accordingly, image content analysis unit 24 may assess zonal image characteristics 50 of the array of zones 62 and/or central zone 64.

In one embodiment, image content analysis unit 24 assesses various zonal image characteristics 50 in each of the array of zones 62 and central zone 64. For example, in one embodiment, image content analysis unit 24 assesses color gradation 52, color gamut 54, and granularity 56 in each of the array of zones 62 and central zone 64 and assesses sharpness 58 in central zone 64. It is, however, within the scope of the present invention for zonal image characteristics 50 to be assessed in any combination of the array of zones 62 and central zone 64, including less than all of the array of zones 62.

Returning to FIG. 2, after image content analysis unit 24 assesses image characteristics 34 of baseline positive image 32, image characteristics 34 are input to film type assessment unit 26. As such, film type assessment unit 26 determines film type 36 of negative film 16 from which scanned negative image 12 is produced.

To determine film type 36 of negative film 16, film type assessment unit 26 compares one or more image characteristics 34 of baseline positive image 32 with characteristics of known film types. For example, a certain film type may produce a certain color gradation such that a gradation change of baseline positive image 32 may be compared with a gradation change of known film types to match negative film 16 with a known film type. In addition, a certain film type may produce a certain gamut of colors such that a color gamut of baseline positive image 32 may be compared with a color gamut of known film types to match negative film 16 with a known film type. In addition, different film speeds may have different granularity such that a granularity of baseline positive image 32 may be compared with a granularity of known film types to match negative film 16 with a known film type. Furthermore, sharpness 58 of baseline positive image 32 may provide additional information such as focal length and/or shutter speed used to produce an image on negative film 16. As such, film type assessment unit 26 maintains or accesses a database or look-up table of known film types and associated characteristics to compare image characteristics 34 of baseline positive image 32 with characteristics of known film types.

As negative film 16 may include one or more frames of images, assessing film type 36 of negative film 16 may be performed for one frame or image of negative film 16. As such, film type 36 of negative film 16 may be applied for all frames or images of negative film 16 when producing positive images 14 from negative film 16.

Figure 6:
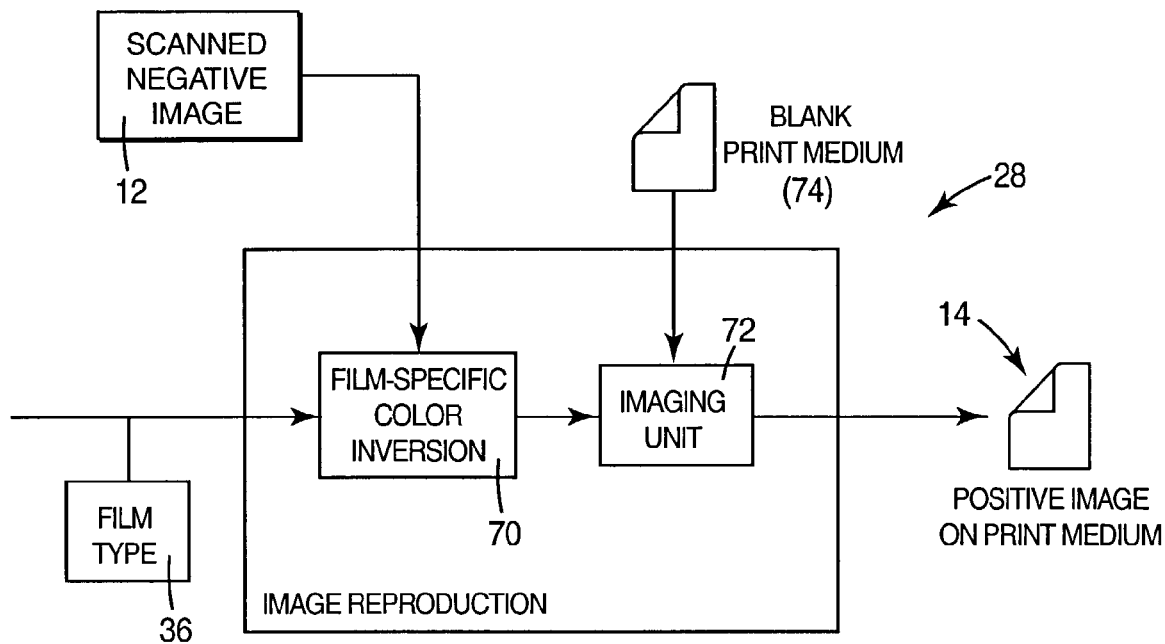
FIG. 6 is a schematic illustration of one embodiment of an image reproduction unit of the negative image processing unit of FIG. 2.
Figure 7:
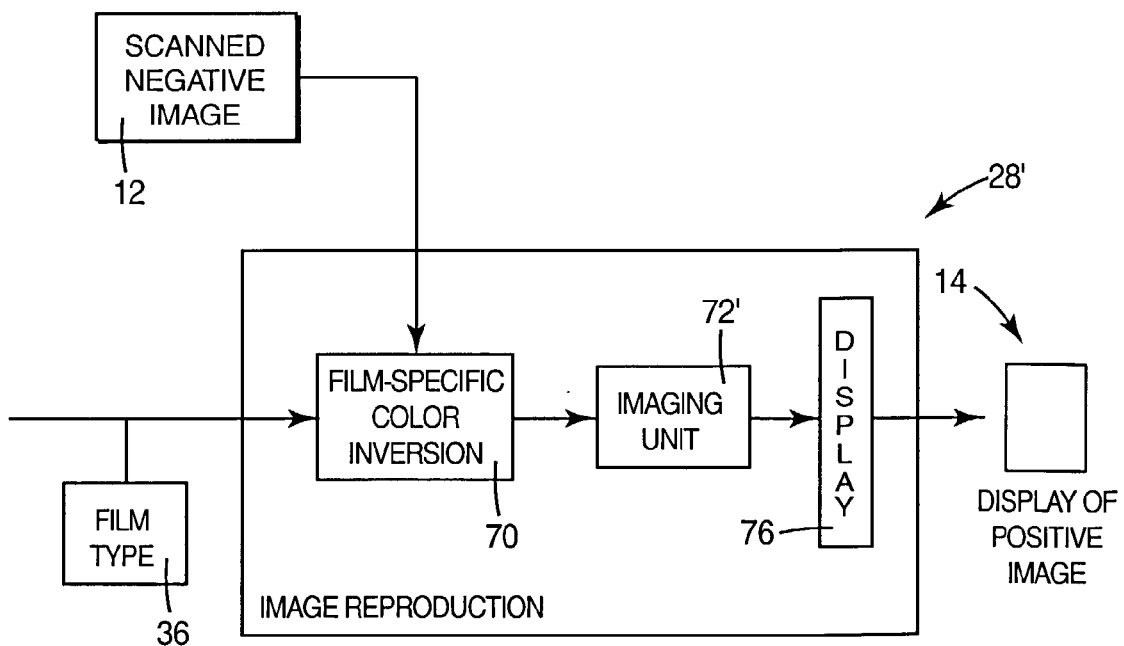
FIG. 7 is a schematic illustration of another embodiment of an image reproduction unit of the negative image processing unit of FIG. 2.

As illustrated in the embodiments of FIGS. 6 and 7, by providing film type 36 of negative film 16 to image reproduction unit 28, image reproduction unit 28 can apply film-specific color inversion 70 to scanned negative image 12. As such, image reproduction unit 28 processes scanned negative image 12 with color inversion optimized for the specific film type 36 of negative film 16 to produce a more accurate and/or optimized positive image 14.

In one embodiment, scanner 18 scans negative film 16 at a predetermined resolution to produce scanned negative image 12. As such, negative image processing unit 20 processes scanned negative image 12 at the predetermined resolution. Thus, image reproduction unit 28 produces positive image 14 based on scanned negative image 12 produced at the predetermined resolution. In another embodiment, however, before image reproduction unit 28 produces positive image 14, scanner 18 rescans negative film 16 at a different resolution, for example, a higher resolution to produce scanned negative image 12. As such, image reproduction unit 28 produces positive image 14 based on scanned negative image 12 produced at the higher resolution.

In one embodiment, negative image processing unit 20 produces positive image 14 as a printed image. Thus, as illustrated in FIG. 6, one embodiment of image reproduction unit 28 includes an imaging unit 72 which receives blank print medium 74 as input. Imaging unit 72 includes, for example, a printer or other hard copy device or system. As such, imaging unit 72 prints positive image 14 on print medium 74. Image reproduction unit 28, therefore, reproduces positive image 14 as a printed image on print medium 74.

In another embodiment, negative image processing unit 20 produces positive image 14 as a displayed image. Thus, as illustrated in FIG. 7, another embodiment of image reproduction unit 28, illustrated as image reproduction unit 28', includes an imaging unit 72' and a display 76. Display 76 may form part of a computer associated with image processing system 10. As such, imaging unit 72' displays positive image 14 on display 76. Image reproduction unit 28', therefore, reproduces positive image 14 as a displayed image on display 76.

Figure 8:
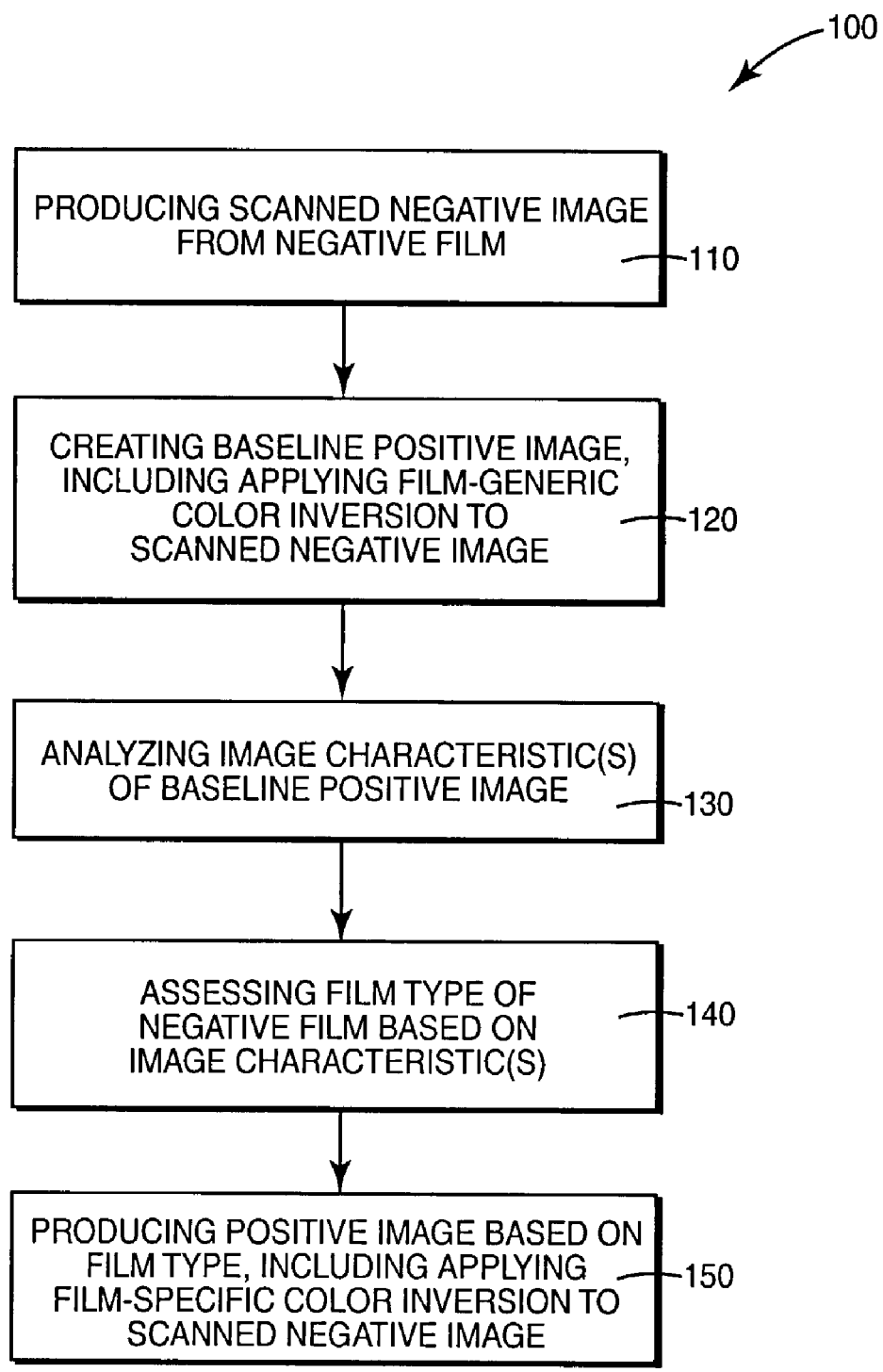
FIG. 8 is a flow diagram illustrating one embodiment of a method of processing a scanned negative image.

FIG. 8 illustrates one embodiment of a method 100 of processing scanned negative image 12. Reference is also made to FIGS. 1–7. At step 110, scanned negative image 12 is produced by scanning negative film 16. Negative film 16 is scanned, for example, by scanner 18, as described above with reference to FIG. 1.

At step 120, baseline positive image 32 is created from scanned negative image 12. In one embodiment, baseline image creation unit 22 applies film-generic color inversion to scanned negative image 12 to convert scanned negative image 12 into positive form, as described above with reference to FIG. 2.

At step 130, image characteristics 34 of baseline positive image 32 are analyzed. In one embodiment, image content analysis unit 24 assesses image characteristics 34 of baseline positive image 32, as described above with reference to FIGS. 2–5.

At step 140, film type 36 of negative film 16, from which scanned negative image 12 is produced, is assessed. In one embodiment, film type assessment unit 26 considers image characteristics 34 of baseline positive image 32, as assessed in step 130, to determine film type 36 of negative film 16.

At step 150, positive image 14 is produced from scanned negative image 12 based on film type 36. In one embodiment, image reproduction unit 28 applies film-specific color inversion to scanned negative image 12, based on film type 36, as assessed in step 140, to convert scanned negative image 12 into positive form. In one embodiment, production of positive image 14 includes printing of positive image 14 on print medium 74, as described above with reference to FIG. 6. In another embodiment, production of positive image 14 includes display of positive image 14 on display 76, as described above with reference to FIG. 7.

Figure 9:
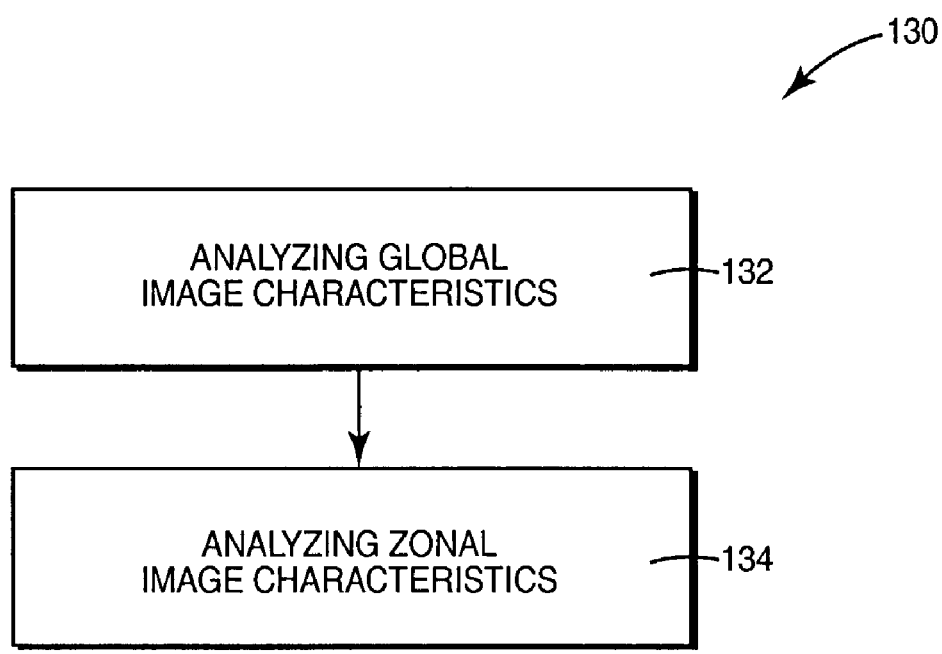
FIG. 9 is a flow diagram illustrating one embodiment of analyzing image characteristics in the method of FIG. 8.

In one embodiment, as illustrated in FIG. 9, analyzing image characteristics 34 of baseline positive image 32 in step 130 includes analyzing global image characteristics 40 of baseline positive image 32, as indicated in step 132, and analyzing zonal image characteristics 50 of baseline positive image 32, as indicated in step 134. Analyzing global image characteristics 40 of baseline positive image 32 in step 132 includes determining, for example, contrast 42 of baseline positive image 32, color saturation 44 of baseline positive image 32, and/or color distribution 46 of baseline positive image 32, as described above with reference to FIG. 3. Analyzing zonal image characteristics 50 of baseline positive image 32 in step 134 includes determining, for example, color gradation 52 of baseline positive image 32, color gamut 54 of baseline positive image 32, granularity 56 of baseline positive image 32, and/or sharpness 58 of baseline positive image 32, as described above with reference to FIG. 4. In addition, analyzing zonal image characteristics 50 of baseline positive image 32 in step 134 includes dividing baseline positive image 32 into zones 60, as described above with reference to FIG. 5.

Figure 10:
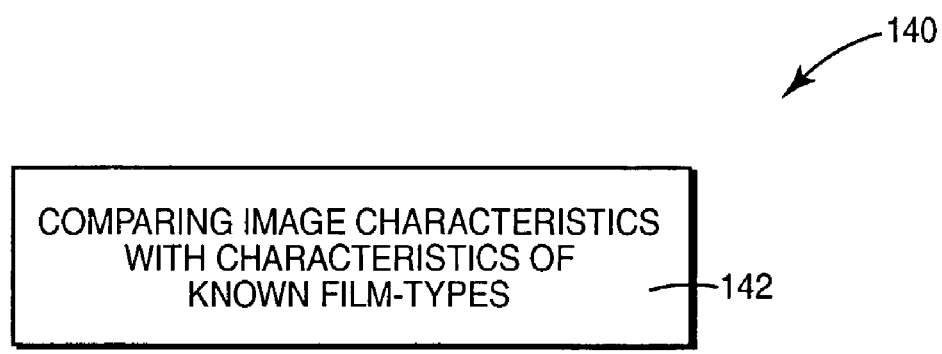
FIG. 10 is a flow diagram illustrating one embodiment of assessing film type in the method of FIG. 8.

In one embodiment, as illustrated in FIG. 10, assessing film type 36 of negative film 16 in step 140 includes comparing image characteristics 34 of baseline positive image 32 with characteristics of known film types, as indicated in step 142. Comparing image characteristics 34 of baseline positive image 32 with characteristics of known film types in step 142 includes comparing global image characteristics 40 and/or zonal image characteristics 50, as assessed in steps 132 and 134, respectively, with characteristics of known film types. As such, film type 36 of negative film 16 is deduced from image characteristics 34.

By applying film-generic color inversion to scanned negative image 12 to produce baseline positive image 32 and analyzing image characteristics 34 of baseline positive image 32, film type 36 of negative film 16, from which scanned negative image 12 is produced, can be assessed. More specifically, by comparing image characteristics 34 of baseline positive image 32, including global image characteristics 40 and/or zonal image characteristics 50, with characteristics of known film types, film type 36 of negative film 16 can be inferred. As such, film-specific color inversion based on film type 36 of negative film 16 can be applied to scanned negative image 12 to produce a more accurate and/or optimized positive image 14.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of processing a scanned negative image produced by scanning a negative film, the method comprising:

creating a baseline positive image from the scanned negative image;

analyzing at least one image characteristic of the baseline positive image;

determining a film type of the negative film based on the at least one image characteristic of the baseline positive image; and producing a positive image from the scanned negative image, including applying film-specific color inversion to the scanned negative image based on the film type as determined from the at least one image characteristic of the baseline positive image.

2. The method of claim 1, wherein creating the baseline positive image includes applying film-generic color inversion to the scanned negative image.

3. The method of claim 1, wherein analyzing the at least one image characteristic of the baseline positive image includes analyzing at least one of a global image characteristic and a zonal image characteristic of the baseline positive image.

4. The method of claim 3, wherein analyzing the at least one of the global image characteristic and the zonal image characteristic includes analyzing the global image characteristic of the baseline positive image, including determining at least one of a contrast of the baseline positive image, a color saturation of the baseline positive image, and a color distribution of the baseline positive image.

5. The method of claim 3, wherein analyzing the at least one of the global image characteristic and the zonal image characteristic includes analyzing the zonal image characteristic of the baseline positive image, including determining at least one of a color gradation of the baseline positive image, a color gamut of the baseline positive image, a granularity of the baseline positive image, and a sharpness of the baseline positive image.

6. The method of claim 3, wherein analyzing the at least one of the global image characteristic with the zonal image characteristic includes analyzing the zonal image characteristic of the baseline positive image, including dividing the baseline positive image into a plurality of zones and assessing the zonal image characteristic for each of the zones.

7. The method of claim 6, wherein dividing the baseline positive image into the plurality of zones includes dividing the baseline positive image into an array of zones.

8. The method of claim 6, wherein dividing the baseline positive image into the plurality of zones includes defining a central zone of the baseline positive image.

9. The method of claim 1, wherein determining the film type of the negative film includes comparing the at least one image characteristic of the baseline positive image with characteristics of known film types.

10. The method of claim 1, wherein producing the positive image from the scanned negative image includes at least one of displaying the positive image and printing the positive image.

11. A computer-readable medium having computer-executable instructions for performing a method of processing a scanned negative image produced by scanning a negative film, the method comprising:

creating a baseline positive image from the scanned negative image;

analyzing at least one image characteristic of the baseline positive image;

determining a film type of the negative film based on the at least one image characteristic of the baseline positive image; and producing a positive image from the scanned negative image, including applying film-specific color inversion to the scanned negative image based on the film type as determined from the at least one image characteristic of the baseline positive Image.

12. A method of processing a scanned negative image produced by scanning a negative film, the method comprising:

creating a baseline positive image from the scanned negative image, including applying film-generic color inversion to the scanned negative image;

analyzing at least one of a global image characteristic and a zonal image characteristic of the baseline positive image;

assigning a film type to the negative film based on the at least one of the global image characteristic and the zonal image characteristic of the baseline positive image; and producing a positive image from the scanned negative image, including applying film-specific color inversion to the scanned negative image based on the film type as determined from the at least one of the global image characteristic and the zonal image characteristic of the baseline positive image.

13. The method of claim 12, wherein analyzing the at least one of the global image characteristic and the zonal image characteristic includes analyzing the global image characteristic of the baseline positive image, including determining at least one of a contrast of the baseline positive image, a color saturation of the baseline positive image, and a color distribution of the baseline positive image.

14. The method of claim 12, wherein analyzing the at least one of the global image characteristic and the zonal image characteristic includes analyzing the zonal image characteristic of the baseline positive image, including determining at least one of a color gradation of the baseline positive image, a color gamut of the baseline positive image, a granularity of the baseline positive image, and a sharpness of the baseline positive image.

15. The method of claim 12, wherein analyzing the at least one of the global image characteristic and the zonal image characteristic includes analyzing the zonal image characteristic of the baseline positive image, including dividing the baseline positive image into a plurality of zones and assessing the zonal image characteristic for each of the zones.

16. The method of claim 15, wherein dividing the baseline positive image into the plurality of zones includes dividing the baseline positive image into an array of zones and a central zone.

17. The method of claim 12, wherein assigning the film type to the negative film includes comparing the at least one of the global image characteristic and the zonal image characteristic of the baseline positive image with characteristics of known film types.

18. The method of claim 12, wherein producing the positive image from the scanned negative image includes at least one of displaying the positive image and printing the positive image.

19. A computer-readable medium having computer-executable instructions for performing a method of processing a scanned negative image produced by scanning a negative film, the method comprising:

creating a baseline positive image from the scanned negative image, including applying film-generic color inversion to the scanned negative image;

analyzing at least one of a global image characteristic and a zonal image characteristic of the baseline positive image;

assigning a film type to the negative film based on the at least one of the global image characteristic and the zonal image characteristic of the baseline positive image; and producing a positive image from the scanned negative image, including applying film-specific color inversion to the scanned negative image based on the film type as determined from the at least one of the global image characteristic and the zonal image characteristic of the baseline positive image.

20. A system for processing a scanned negative image scanned from a negative film, the system comprising:

a baseline image creation unit adapted to create a baseline positive image from the scanned negative image;

an image content analysis unit adapted to analyze at least one image characteristic of the baseline positive image;

a film type assessment unit adapted to assign a film type to the negative film based on the at least one image characteristic of the baseline positive image; and an image reproduction unit adapted to apply film-specific color inversion to the scanned negative image based on the film type as determined from the at least one image characteristic of the baseline positive image and produce a positive image.

21. The system of claim 20, wherein the baseline image creation unit is adapted to apply film-generic color inversion to the scanned negative image to create the baseline positive image.

22. The system of claim 20, wherein the image content analysis unit is adapted to analyze at least one of a global image characteristic and a zonal image characteristic of the baseline positive image.

23. The system of claim 22, wherein the global image characteristic of the baseline positive image includes at least one of a contrast of the baseline positive image, a color saturation of the baseline positive image, and a color distribution of the baseline positive image.

24. The system of claim 22, wherein the zonal image characteristic of the baseline positive image includes at least one of a color gradation of the baseline positive image, a color gamut of the baseline positive image, a granularity of the baseline positive image, and a sharpness of the baseline positive image.

25. The system of claim 22, wherein the image content analysis unit is adapted to divide the baseline positive image into a plurality of zones and assess the zonal image characteristic for each of the zones.

26. The system of claim 25, wherein the plurality of zones include an array of zones of the baseline positive image.

27. The system of claim 25, wherein the plurality of zones includes a central zone of the baseline positive image.

28. The system of claim 20, wherein the film type assessment unit is adapted to compare the at least one image characteristic of the baseline positive image with characteristics of known film types to assign the film type to the negative film.

29. The system of claim 20, wherein the image reproduction unit is adapted to at least one of display the positive image and print the positive image.

* * * * *

UNITED STATES PATENT AND TRADEMARK OFFICE
CERTIFICATE OF CORRECTION

PATENT NO.         : 7,149,004 B2                                          Page 1 of 1
APPLICATION NO. : 10/175601
DATED              : December 12, 2006
INVENTOR(S)        : Charles Chi Jia et al.

It is certified that error appears in the above-identified patent and that said Letters Patent is hereby corrected as shown below:

In column 7, line 35, in Claim 6, delete "with" and insert -- and --, therefor.

In column 8, line 2, in Claim 11, delete "Image" and insert -- image --, therefor.

Signed and Sealed this

Sixteenth Day of December, 2008

JON W. DUDAS
*Director of the United States Patent and Trademark Office*